Oct. 19, 1926.
H. P. ROBBINS
WEIGH CONVEYER
Filed Nov. 28, 1921 — 2 Sheets-Sheet 2
1,603,865
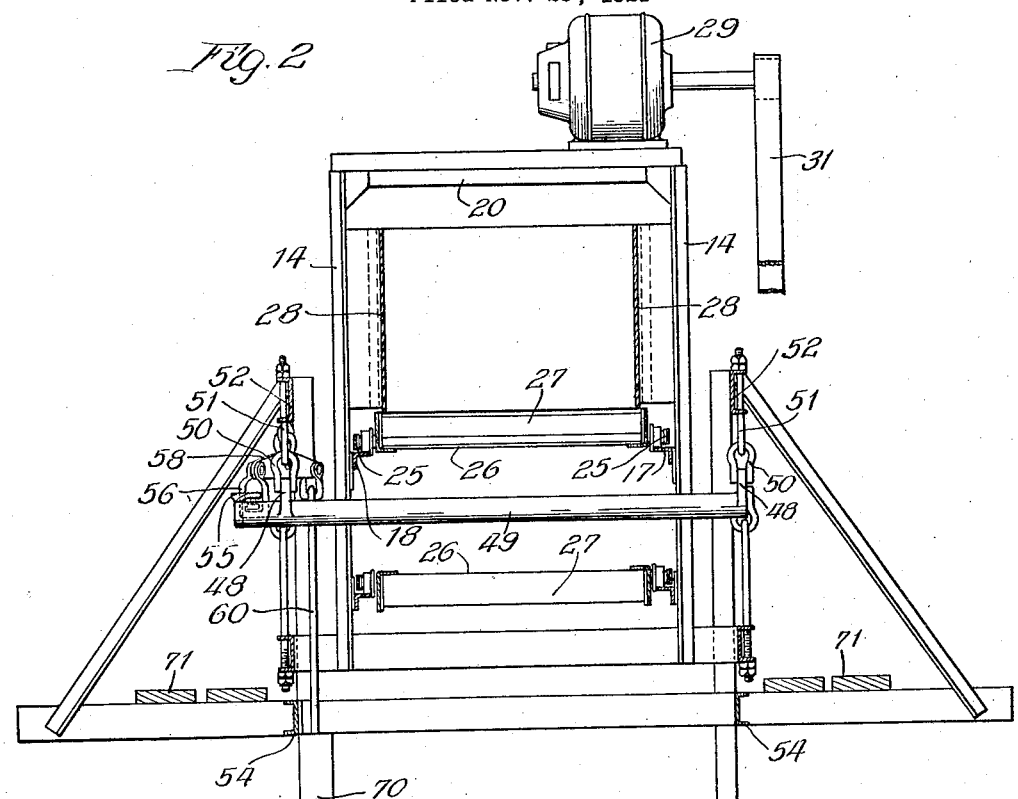
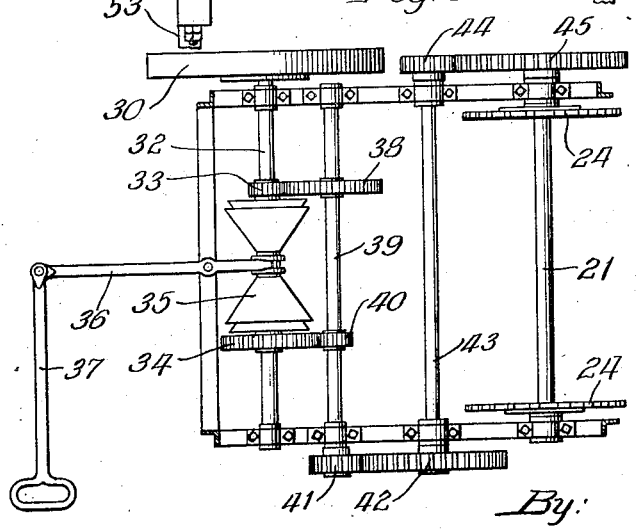

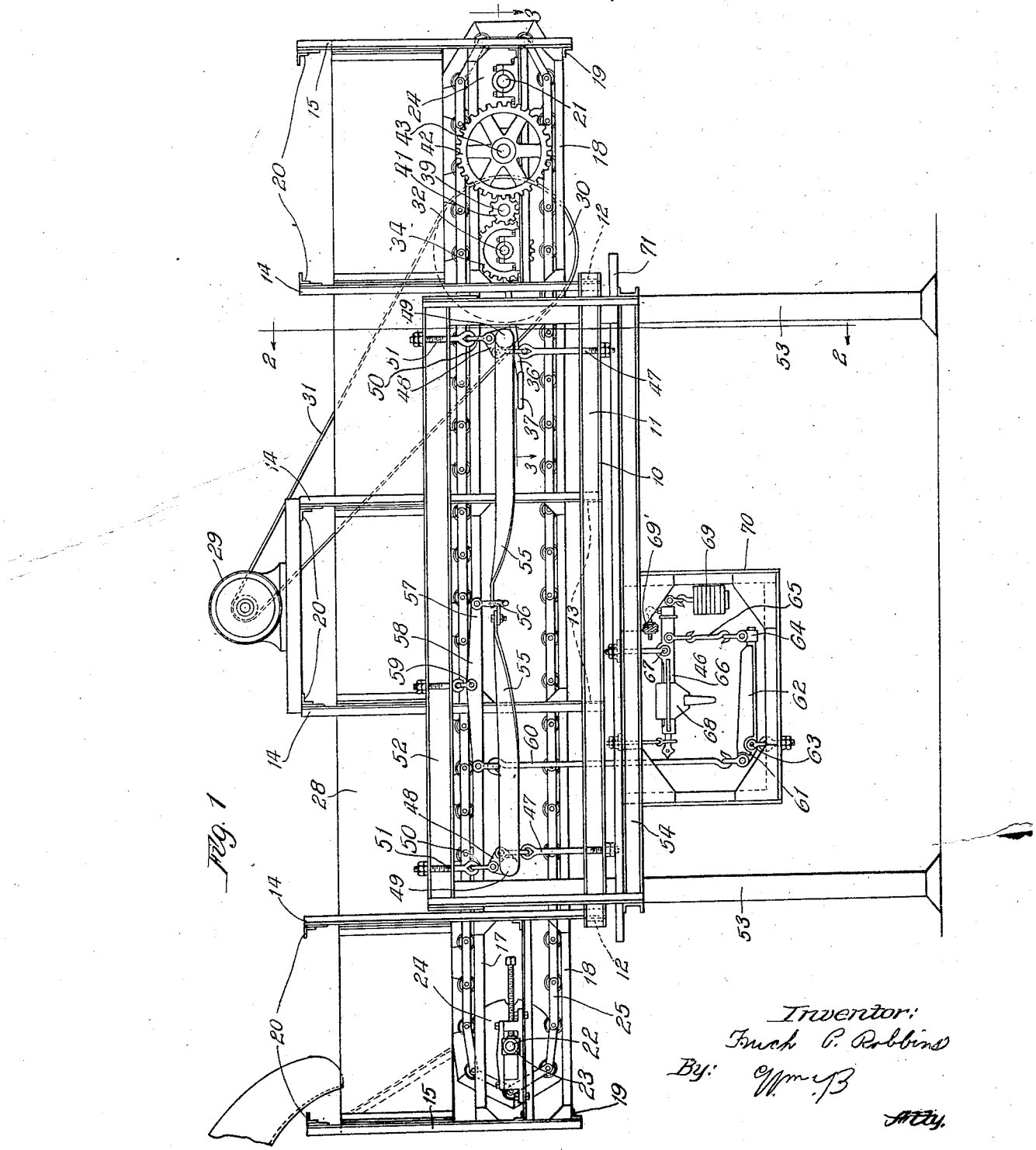

Patented Oct. 19, 1926.

1,603,865

UNITED STATES PATENT OFFICE.

HUGH P. ROBBINS, OF CHICAGO, ILLINOIS.

WEIGH CONVEYER.

Application filed November 28, 1921. Serial No. 518,153.

This invention relates to the art of handling commodities in bulk and has for its object to provide improved means and procedure for directly ascertaining the net weight of a load, batch or other quantity of a commodity.

Another object of the invention is to improve the procedure in handling commodities whereby weighing several constituents of a load or batch, making memoranda of the several weights, and the calculations heretofore customary are eliminated.

A specific object of the invention is to produce a conveyer equipped with multiple speed driving mechanism and mounted on scale rigging whereby a commodity may be deposited on the conveyer slowly while the low speed driving mechanism is in operation, the conveyer stops when fully loaded, or when the desired quantity to be weighed is resting thereon, the net weight taken directly, and the load on the conveyer afterwards rapidly disposed of by engaging the high speed driving gear.

Other objects will become apparent as the description is read in connection with the accompanying drawing showing a selected embodiment of the invention in which—

Fig. 1 is a side elevation illustrating a specific embodiment of the invention;

Fig. 2 is a transverse section on the line 2—2 of Fig. 1; and

Fig. 3 is a plan view illustrating a selected form of driving mechanism.

Referring to the drawing and the reference characters thereon, 10 indicates a rectangular frame made of channel iron side pieces 11, end pieces 12 and intermediate cross pieces 13. Suitably secured to the frame and extending upwardly therefrom are the columns 14 which carry the framework of a conveyer. This framework overhangs the frame 10 at each end and includes the auxiliary uprights 15 connected to the columns 14 by the longitudinal members 16, 17 and 18. Suitable cross braces 19 and 20 give the conveyer frame lateral stability. A shaft 21 suitably journaled in fixed bearings at one end of the conveyer frame and a shaft 22 journaled in adjustable bearings 23 at the opposite end of the frame are equipped with sprockets 24 over which run the chains 25 of the conveyer belt 26. This belt may be of any suitable construction but is preferably provided with the cross-members 27 which act as pushers to constrain the load to travel with the conveyer. As shown in Fig. 2, the upper run of the belt passes between a pair of guide walls 28 which may be used to maintain a considerable quantity of loose material on the belt. These guide walls may be carried by the conveyer frame in any suitable manner.

In order to drive the belt at a plurality of speeds, I provide a motor and interpose between it and one of the shafts of the conveyer suitable change-speed gearing. As illustrated, an electric motor 29 drives the pulley 30 through a belt 31; and the pulley 30 is fixed to a shaft 32 having thereon a loosely mounted pinion 33 and a loosely mounted gear 34 adapted to be engaged with the shaft by means of a clutch 35 which is operated by the lever 36 under the control of a handle 37. The pinion 33 meshes with a gear 38 on a countershaft 39, which also carries a pinion 40 adapted to mesh with the gear 34, and a pinion 41 meshing with a gear 42 on a second countershaft 43 having a pinion 44 meshing with the gear 43 on shaft 21. By clutching the pinion 33 to the shaft 32, the conveyer may be driven at a very slow speed, and by clutching in gear 34 it may be driven at a relatively high speed. This arrangement makes it possible to drive the conveyer slowly while it is receiving a load or batch of material, then stop the conveyer and weigh the load, and then drive the conveyer at high speed to quickly dispose of the weighed material.

In order to directly ascertain the net weight of any load on the conveyer, I mount the frame 10 with all the superposed conveyer mechanism on a suitable scale rigging or mechanism, generally indicated by the reference character 46. The scale rigging here shown is merely selected on account of its suitability for certain work, and I may replace it with any other type or kind that may be found better adapted to particular conditions.

Obviously the gear ratios may be designed to suit particular conditions, and more speeds may be supplied if found desirable. The low speed should be suited to the rate at which the commodity reaches the conveyer so that the load may be properly distributed, and all of a particular quantity may be put on the conveyer for weighing, in the ordinary course of events. However, when required, large quantities can be handled in batches in proportion to the capacity of the conveyer.

As illustrated, the frame 10 is suspended by the eye-bolts 47 having their upper ends connected to the ears 48 on shafts 49 which are suspended by means of links 50 and eye-bolts 51 from the beams 52 of a suitable main frame or support here shown as comprising the columns 53 secured together by angle irons 54 and the beams 52. The shafts 49 are equipped with arms 55 having their free ends surrounded by a loop 56 pivoted to one end 57 of a lever 58 having a fulcrum at 59 and connected at its opposite end by a link 60 to the short arm 61 of the lever 62, fulcrumed at 63. The long arm of the lever 62 is connected by a shackle 64 and a link 65 with a scale beam 66 fulcrumed at 67 and equipped with a poise 68, a counterweight 69, and a counterpoise 69'. As illustrated, the scale beam is arranged within a cage 70 suspended from one of the angle irons 54, but it may be located in any other suitable position as will be understood by those skilled in the art.

In Fig. 2 I have shown platforms 71 on each side of the conveyer at convenient height for an operator or workman, but it will be understood that the control of the mechanism described may be operated from any suitable position. Preferably the operator will be at sufficient elevation to permit him to observe practically the entire operation of handling the particular commodity.

The embodiment of the invention above described is particularly adapted to use at receiving stations for sugar beets. By custom, beets are delivered to these stations in carts, wagons or trucks, and dumped or fed into a hopper or other receptacle from which they are taken to a cleaner and separated from all extraneous matter, and the cleaned beets are delivered to a storage bin or car, either directly or through the intermediary of a conveyer or chute.

Usually the vehicle and gross load are weighed together, then the vehicle and the extraneous matter removed from the beets are weighed and a calculation made to determine the net weight of the beets. This is a source of numerous errors and great annoyance to all concerned.

By interposing the above described mechanism between the cleaner and the car or storage bin, the net weight of the clean beets can be obtained by a procedure so simple and direct as to make errors practically impossible. For example: assuming the apparatus to be clear and in operating condition, a wagon load of beets is dumped in the hopper of a conveyer leading to the cleaner where they are separated from all extraneous matter and delivered in a more or less continuous stream to a chute or conveyer leading to the weigh conveyer, the belt of which is started at slow speed as soon as the beets begin to aproach it and the load distributed along its length; when the last of the load reaches the weigh conveyer, the belt is stopped, the scale beam balanced and the weight noted; after which the belt is again started and if desirable, driven at high speed to quickly dispose of the load.

I am aware that changes may be made in the form, construction and arrangement of the invention, as set forth in the selected embodiment herein, without departing from the scope or sacrificing any of its material advantages, and I therefore reserve the right to make all such changes as fairly fall within the scope of the following claims.

I claim:

1. The combination of an endless conveyer, means for driving the conveyer at one speed to distribute a load over its entire length, a scale rigging upon which the conveyer is mounted whereby the net weight of a load on the conveyer may be directly determined, and means for driving the conveyer at a higher rate of speed to discharge the load.

2. The combination of a conveyer, means for determining the net weight of a load on said conveyer, a motor, and selective gear transmission between the motor and the belt whereby the conveyer may be driven at one speed to distribute a load over its entire length and at a higher rate of speed to discharge the load.

3. The combination of a main frame, scale rigging carried by the main frame, a conveyer supported on the scale rigging, a motor, change-speed transmission between the motor and the conveyer whereby the conveyer may be driven at one speed to distribute a load over its entire length and at a higher speed to discharge the load.

4. The combination of a main frame, scale rigging carried by the main frame, and a conveyer supported on said scale rigging comprising a frame, an endless belt carried by the frame, a motor, change-speed transmission between said motor and said belt, and guides carried by said frame for sustaining a load on said conveyer.

HUGH P. ROBBINS.